United States Patent [19]

Moser et al.

[11] Patent Number: 4,724,890

[45] Date of Patent: Feb. 16, 1988

[54] PROCESS FOR CONNECTING FROGS CONSISTING OF AUSTENITIC MANGANESE STEEL CASTING WITH RAILS CONSISTING OF CARBON STEEL

[75] Inventors: Alfred Moser; Hubert Augustin, both of Leoben, Austria

[73] Assignee: Voest-Alpine Aktiengesellschaft, Austria

[21] Appl. No.: 883,947

[22] Filed: Jul. 10, 1986

[30] Foreign Application Priority Data

Jul. 18, 1985 [AT] Austria .................................. 2141/85

[51] Int. Cl.$^4$ ...................... B22D 23/00; B22D 15/00
[52] U.S. Cl. ....................................... 164/54; 164/108; 164/125; 228/198; 228/200; 228/241
[58] Field of Search ................... 164/54, 53, 108, 125; 249/86; 228/241, 263.15, 198, 200

[56] References Cited

U.S. PATENT DOCUMENTS

| | | | |
|---|---|---|---|
| 1,569,025 | 1/1926 | Pennington | 228/200 |
| 4,005,741 | 2/1977 | Juganson et al. | 164/54 |
| 4,216,816 | 8/1980 | Ashton et al. | 164/54 |
| 4,389,015 | 6/1983 | Guntermann et al. | 164/54 |

FOREIGN PATENT DOCUMENTS

| | | | |
|---|---|---|---|
| 367672 | 8/1977 | Austria | 164/54 |
| 2265493 | 11/1975 | France | 228/200 |

OTHER PUBLICATIONS

Metals Handbook, 8th Edition, vol. 1, p. 3, 1961.

*Primary Examiner*—Nicholas P. Godici
*Assistant Examiner*—Samuel M. Heinrich
*Attorney, Agent, or Firm*—Cushman, Darby & Cushman

[57] ABSTRACT

For the purpose of connecting frogs consisting of austenitic manganese steel casting with rails consisting of carbon steel there is proposed an aluminothermic process in which the carbon content of the aluminothermic welded connection is limited with 0.2 percent by weight. In this case, the procedure is preferably such that the composition of the melt corresponds, as related to the Schäffler-diagram, to a Ni-equivalent of 13 to 35 percent and to a Cr-equivalent of 8 to 25 percent, noting that for a carbon content of $\leq 0.15$ percent and preferably $\leq 0.1$ percent, the equivalent value for Ni is $1 \times \%Ni + 30 \times \%C + 0.5\%Mn$ and the equivalent value for Cr is $1 \times \%Cr + 1 \times \%Mo + 1.5 \times \%Si$.

7 Claims, No Drawings

PROCESS FOR CONNECTING FROGS CONSISTING OF AUSTENITIC MANGANESE STEEL CASTING WITH RAILS CONSISTING OF CARBON STEEL

BACKGROUND OF THE INVENTION

1. Field of the Invention

The invention refers to a process for connecting frogs consisting of austenitic manganese steel casting with rails consisting of carbon steel by aluminothermic welding.

2. Description of the Prior Art

Austenitic manganese steel castings are, on account of the excellent wear resistance of such steels, the most frequently used materials for the frogs of crossings or switches in railroad construction. The rails used in railroad construction consist, as a rule, of carbon steel and direct welding of such carbon steels with austenitic manganese steel castings is not easily possible on account of the different temperature treatment of the work pieces to be connected one with the other. For this reason, frogs consisting of austenitic manganese steel castings are at present connected with the connecting rails by means of fishplates or, prior to moving the track, the frogs consisting of austenitic manganese steel casting are welded by using an intermediate piece of low carbon austenitic steel with a connecting rail consisting of carbon steel which connecting rail can then be welded in the track with the connecting rail. In case of fracture of this connection the frog must be dismounted for welding thereto a new intermediate piece and the connecting rail. It is already further known to make the welding connection by aluminothermic welding, noting that also in this case a perfect connection can not easily be obtained. The reason therefor is, that martensite is formed on subsequent cooling on account of the diffusion processes taking place during welding within the austenitic manganese steel in the connecting zone. Such formation of martensite could only be avoided by an extremely slow cooling.

Carbide precipitations could, however, occur in the heat-influenced zone of the austenitic manganese steel on slow cooling, which would equally detract from the toughness.

From AT-PS No. 350 881 there has become known a process for connecting frogs consisting of austenitic manganese steel casting with rails consisting of carbon steel, according to which an intermediate piece having a maximum length of 20 to 25 mm and consisting of a low carbon austenitic steel is welded with the frog consisting of austenitic manganese steel casting. Cooling of this welding connection is effected relatively slow as compared with the cooling effected after the subsequent welding of the intermeidate piece with the connecting rail. For making such a welding connection there was thus required a plurality of subsequent process steps, each of which required precise control of the individual process parameters.

It is already further known to make the welding connection by aluminothermic welding. For this purpose, in AT-PS No. 374 720 an aluminothermically formed steel welded connection has been proposed which is substantially free of phosphorous and silicon and having a carbon content between 0.75 and 0.95 percent by weight. By means of such an aluminothermic melt, carbide precipitations can not reliably be prevented, which might detract from the toughness.

SUMMARY OF THE INVENTION

The invention now aims at providing the possibility to effect welding by using an aluminothermically formed melt which substantially prevents the danger of carbide precipitations and which prevents martensite formation even in case of relatively rapid cooling. For solving this task, the process according to the invention essentially consists in that an aluminothermic mixture is used which results in a low carbon, austenitic melt, the carbon content of which is $\leq 0.2$ percent by weight, preferably $\leq 0.15$ percent by weight. On account of using an aluminothermic mixture resulting in a low carbon austenitic melt having a maximum carbon content of 0.2 percent by weight, the danger of carbide precipitation can substantially be reduced, and it has been found that martensite formation is not to be suspected even in case of rapid cooling. Also any increase in hardness of the rail material can easily be avoided by subjecting this portion to a comparatively slower cooling. In a particularly simple manner such retarded cooling can be achieved by providing a cover of heat insulating protective layers, in particular of heat-insulating refractory pulverulent materials, within the connecting area to the connecting rail.

In a particularly advantageous manner, the process according to the invention is performed such that the composition of the melt corresponds, as related to the Schaffler-diagram, to a Ni-equivalent of 13 to 35 percent and to a Cr-equivalent of 8 to 25 percent, noting that, for a carbon content of $\leq 0.15$ percent and preferably $\leq 0.1$ percent, the equivalent value for Ni is $1\times\%Ni + 30\times\%C + 0.5\times\%Mn$ and the equivalent value for Cr is $1\times\%Cr + 1\times\%Mo + 1.5\times\%Si$. By means of such welds, there can be obtained particularly wear-resistant, durable and fracture-proof connections between austenitic manganese steel castings and nominal rail steel.

What is claimed is:

1. Process for connecting frogs consisting of austenitic manganese steel castings with rails consisting of carbon steel by aluminothermic welding, characterized in that an aluminothermic mixture is used which results in a low carbon austenitic welded connection, the carbon content of which is $\leq 0.2$ percent by weight.

2. Process as claimed in claim 1, characterized in that the composition of the welded connection corresponds, as related to the Schaffler-diagram, to a Ni-equivalent of 13 to 35 percent and to a Cr-equivalent of 8 to 25 percent, for a carbon content of $\leq 0.15$ percent, the equivalent value of Ni being $1\times\%Ni + 30\times\%C + 0.5\times\%Mn$ and the equivalent value for Cr is $1\times\%Cr + 1\times\%Mo + 1.5\times\%Si$.

3. Process as claimed in claim 1 or 2, characterized in that, after solidification of the aluminothermic welded connection, further cooling is effected more rapid in the area of the austenitic manganese steel casting than in the area of the rail consisting of carbon steel.

4. Process as claimed in claim 3, characterized in that for cooling the welding connection the connecting area to the nominal rail is covered with heat-insulating refractory material.

5. A process as in claim 1 wherein the carbon content of the welded connection is $\leq 0.15$ percent by weight.

6. A process as in claim 2 wherein the carbon content of the welded connection is $\leq 0.15$ percent by weight.

7. A process as in claim 4 wherein the refractory material is pulverant material.

* * * * *